United States Patent
Chuang

(10) Patent No.: US 6,882,528 B2
(45) Date of Patent: Apr. 19, 2005

(54) SUSPENSION-TYPE SHOCK-AVOIDING STRUCTURE FOR A HARD DISK

(75) Inventor: Yung-Shun Chuang, Hsin-Tien (TW)

(73) Assignee: Aaeon Technology Inc., Taipei (TW)

( * ) Notice: Subject to any disclaimer, the term of this patent is extended or adjusted under 35 U.S.C. 154(b) by 176 days.

(21) Appl. No.: 10/437,989

(22) Filed: May 15, 2003

(65) Prior Publication Data

US 2004/0228073 A1 Nov. 18, 2004

(51) Int. Cl.[7] .............................................. G11B 33/08
(52) U.S. Cl. ........................ 361/685; 361/683; 361/684; 312/223.1; 312/223.2; 369/263
(58) Field of Search ................................ 361/679, 683, 361/684, 685, 732, 737, 727–728; 248/618, 633–638; 312/223.1, 233.2, 332.1, 333; 369/75.1–82, 263, 44.15; 411/542, 544, 970, 979

(56) References Cited

U.S. PATENT DOCUMENTS

| | | | | |
|---|---|---|---|---|
| 4,979,062 | A | * 12/1990 | Stefansky et al. | 360/97.02 |
| 5,124,855 | A | * 6/1992 | Dew et al. | 360/97.02 |
| 5,131,619 | A | * 7/1992 | Daugherty et al. | 248/635 |
| 6,292,455 | B1 | * 9/2001 | Saruwatari et al. | 720/692 |
| 6,498,722 | B1 | * 12/2002 | Stolz et al. | 361/685 |
| 6,606,242 | B1 | * 8/2003 | Goodman et al. | 361/685 |
| 2002/0051338 | A1 | * 5/2002 | Jiang et al. | 361/685 |

FOREIGN PATENT DOCUMENTS

| | | | | |
|---|---|---|---|---|
| EP | 1 202 280 A2 | * | 2/2002 | G11B/33/08 |
| JP | 402061882 A | * | 3/1990 | G11B/33/08 |
| JP | 408055468 A | * | 2/1996 | G11B/33/08 |
| JP | 02002227929 A | * | 8/2002 | F16F/15/08 |
| TW | 458497 | | 10/2001 | |

OTHER PUBLICATIONS

The Article "Shock mount", IBM Technical Disclosure Bulletin, Dec. 1987, vol.# 30; Issue # 7, pp. 257–258).*

* cited by examiner

Primary Examiner—Michael Datskovsky
(74) Attorney, Agent, or Firm—Rabin & Berdo, P.C.

(57) ABSTRACT

A shock-avoiding structure for hard disk having four threaded apertures in four corners is disclosed. The device comprises a plurality of fasteners each having a first portion driven into the aperture and a second portion projected from the hard disk; a parallelepiped chassis in a computer case for receiving the hard disk, the chassis including a plurality of recesses on either side; and a plurality of elongated shock absorbing members formed of elastomeric material, each having a first section end urged against the second portion of the fastener, a second section projected from the side of the chassis, and an intermediate, annular groove anchored on the recess for suspending the hard disk in the chassis. An assembly order of the fasteners and the shock absorbing members is not critical in a manufacturing process, thus significantly increasing yield. The hard disk can also be configured as a removable one.

17 Claims, 4 Drawing Sheets

SUSPENSION-TYPE SHOCK-AVOIDING STRUCTURE FOR A HARD DISK

BACKGROUND OF THE INVENTION

1. Field of the Invention

The present invention relates to shock-avoiding structure and more particularly to an improved suspension-type shock-avoiding structure for a hard disk mounted in a computer such as an industrial computer or notebook computer.

2. Description of Related Art

A conventional shock-avoiding structure for hard disk is implemented as either load or suspension based one. For the former, thing made of or stuffed with soft material (e.g., sponge, foam, or styrofoam) is filled around the hard disk for protection the hard disk against jarring when a computer is running. However, such arrangement has disadvantages of occupying precious space and being poor in dissipating heat from the hard disk.

As to the latter, it typically employs an inner chassis for receiving a hard disk, an outer cabinet mounted in a computer case, and a shock-avoiding structure is mounted between the chassis and the cabinet. That is, the chassis is suspended within the cabinet without contacting the computer case. As a result, the effect of shocks transmitted from the computer case to the hard disk can be lessened.

Taiwanese Patent Published No. 458,497 entitled "Shock-proof Frame of Computer Storage Device" disclosed a staged, parallelepiped chassis, a parallelepiped cabinet having a lower opening for permitting a CD-ROM and a floppy disk to mount therein, a shock absorbing member in each of four bottom corners of the chassis, a bottom plate under the shock absorbing members, and a hard disk mounted on the bottom plate, i.e., the hard disk is suspended below the chassis. The patent functions well in a desktop computer. However, it is not applicable to a notebook computer. Thus, the need for improvement still exists.

SUMMARY OF THE INVENTION

It is an object of the present invention to provide a shock-avoiding structure for a parallelepiped hard disk, the hard disk including four threaded apertures in four corners, comprising a plurality of fasteners each having a first portion driven into the aperture and a second portion projected from the hard disk; a parallelepiped chassis in a computer case for receiving the hard disk, the chassis including a plurality of recesses on either side; and a plurality of elongated shock absorbing members formed of elastomeric material, each of the shock absorbing members having a first section end urged against the second portion of the fastener, a second section projected from the side of the chassis, and an intermediate section separated the first section from the second section and anchored on the recess so as to suspend the hard disk in the chassis. By utilizing this, advantages such as minimum installation space, effective heat dissipation of the hard disk, and well protection against shock are achieved.

In one aspect of the present invention, the present invention can perform well in both high and lower frequency working environments.

In another aspect of the present invention, the present invention can withstand a strong shock or even a falling on the ground.

In still another aspect of the present invention, an assembly order of the fasteners and the shock absorbing members is not critical in a manufacturing process. In other words, it is possible of either mounting the shock absorbing members on the chassis and fastening the fasteners between the shock absorbing members and the hard disk in sequence or fastening the fasteners between the shock absorbing members and the hard disk and mounting the shock absorbing members on the chassis in sequence. This can significantly increase yield.

In a further another aspect of the present invention, the hard disk can be mounted in a cabinet to serve as a removable hard disk.

The above and other objects, features and advantages of the present invention will become apparent from the following detailed description taken with the accompanying drawings.

DETAILED DESCRIPTION OF THE PREFERRED EMBODIMENTS

Figure 1:
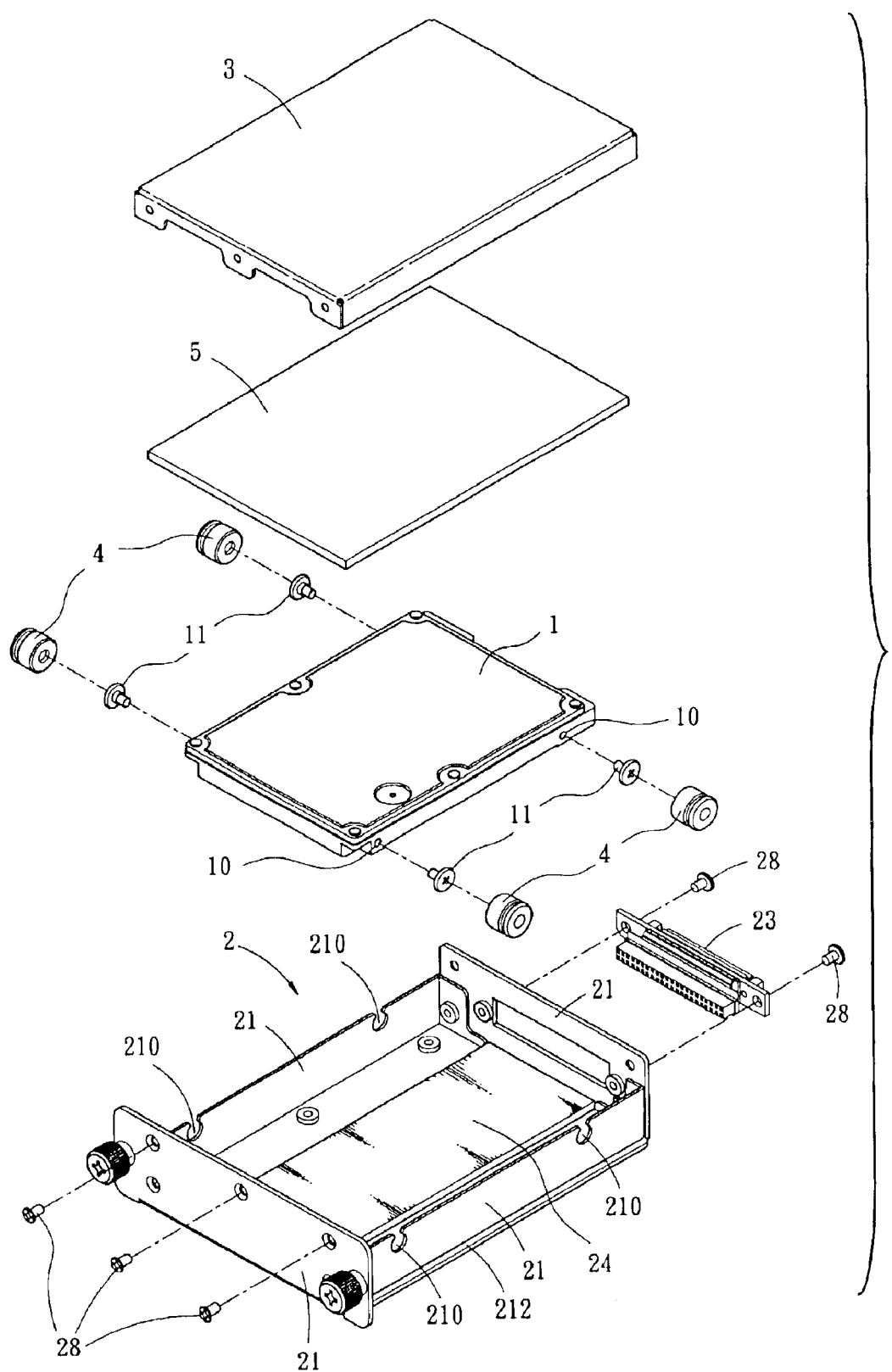
FIG. 1 is an exploded view of a hard disk adapted to suspend in a chassis by means of shock-avoiding structure according to a first preferred embodiment of the invention.
Figure 2:
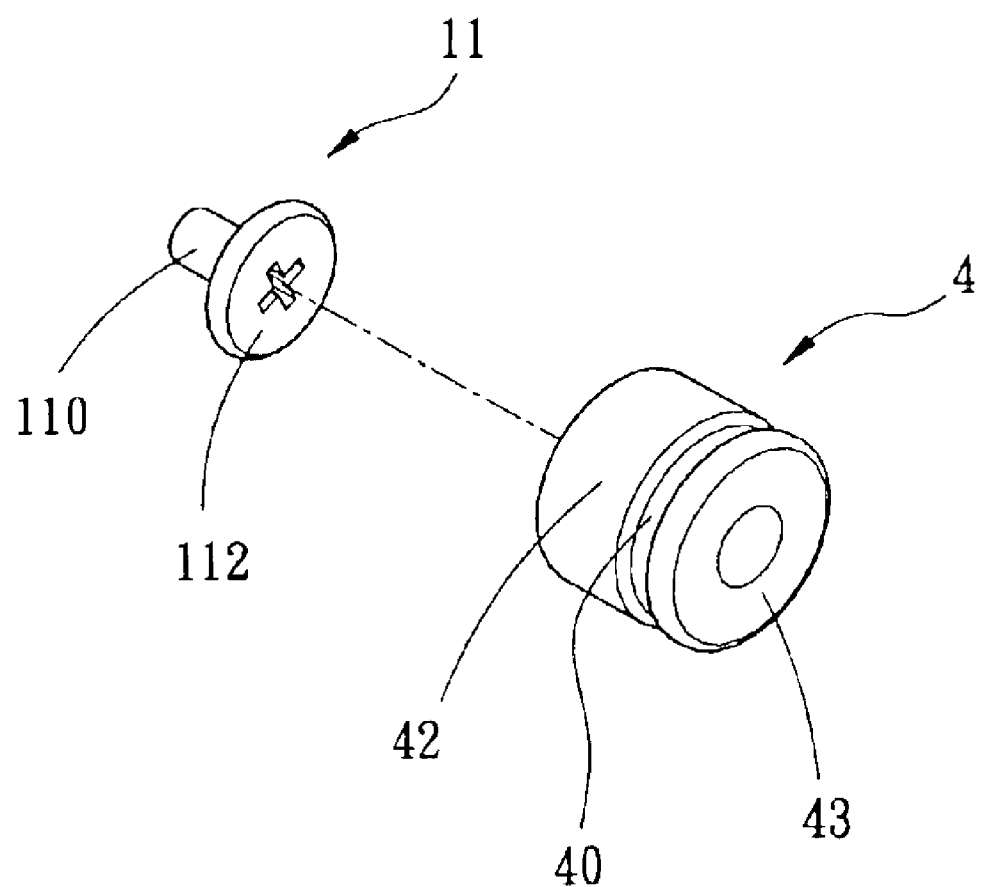
FIG. 2 is a perspective view of fastener and shock absorbing member shown in FIG. 1.
Figure 3:
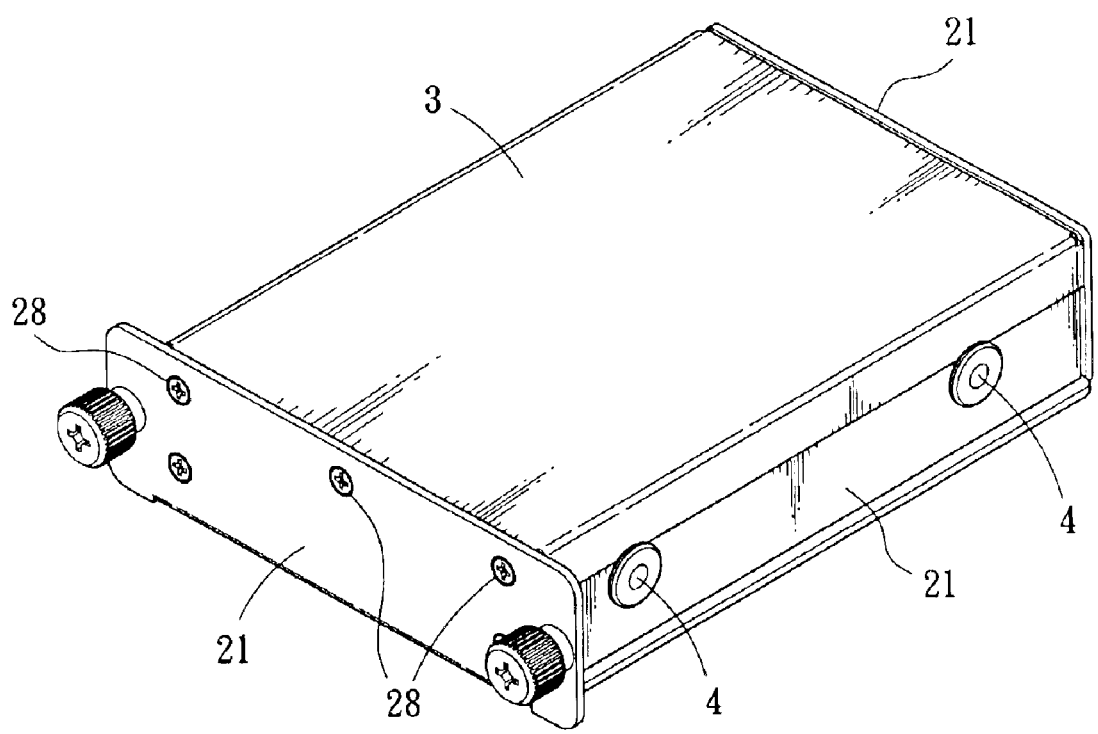
FIG. 3 is a perspective view of the chassis with the hard disk suspended therein.

Referring to FIGS. 1, 2, and 3, a hard disk 1 is protected by a shock-avoiding structure in accordance with the invention. The parallelepiped hard disk 1 is mounted in a computer case (not shown). The hard disk 1 comprises a threaded aperture 10 in each of its four corners. The shock-avoiding structure comprises a plurality of (four are shown) fasteners 11, the fastener 11 being implemented as a screw having an enlarged head 112 and a shank 110 driven into the aperture 10 for fastening; a plurality of (four are shown) elongated shock absorbing members 4, the shock absorbing member 4 being implemented as a cylinder having a first section 42 urged against the head 112, a second section 43, and an intermediate annular groove 40 for separating the first section 42 from the second section 43; and a parallelepiped chassis 2 having an open top, four sides 21 in which the rear side 21 has a rectangular opening with an IDE (Integrated Drive Electronics) connector 23 threadedly secured thereto by means of two screws 28 for interconnecting the hard disk 1 and a bus extended from a mainboard of computer, and two spaced, circular recesses 210 are formed on an upper edge of either side 21, the grooves 40 being anchored on the recesses 210 so as to suspend the hard disk 1 within the chassis 2.

Preferably, the shock absorbing member 4 is formed of rubber, sponge, or silicone rubber (as implemented in the invention). It is understood that pad materials having a small hardness value have a better shock absorbing capability as applied in a high frequency working environment while pad materials having a large hardness value have a better shock absorbing capability as applied in a low frequency working environment. The hardness value of silicone rubber is ranged from about 9.5 to about 10.5. Hence, the shock absorbing members 4 perform well in both high and lower frequency working environments. In practice, the silicone rubber adopted by the invention has a hardness value of 10, resulting in a best shock absorbing effect.

For providing a protection against shock from both top and underside of the hard disk 1, the shock-avoiding structure further comprises an upper pad 5 on top of the hard disk 1, a top cover 3 threadedly secured to the front side 21 by means of screws 28 for concealing the upper pad 5, and a lower pad 24 sandwiched between the bottom of the hard disk 1 and the bottom of the chassis 2. Preferably, either the upper pad 5 or the lower pad 24 is formed of foam, rubber, or sponge. Moreover, glue may be used to fasten the upper pad 5 and the top cover 3 together. By configuring as the above, the hard disk 1 is well protected against the force of shocks.

A general hard disk is required for to withstand one acceleration of gravity (1G) on a test platform in testing a shock absorbing capability thereof as adopted by a well known industrial standard. As to industrial hard disks, a higher 3G is required. An experiment of shock absorbing capability with respect the hard disk 1 incorporating the above shock-avoiding structure is conducted by installing a sensor on the hard disk 1. A result shows that the hard disk 1 performs well after running the computer for duration of 10 (ten) cycles. This means that the hard disk 1 of the invention can pass the well known industrial standard which also requires an industrial hard disk to be able to withstand 3G. Moreover, the hard disk can withstand a shock more than 1G in each axis of Cartesian coordinates in case of strong shock or even a falling on the ground.

Note that in a manufacturing process an assembly order of the fasteners 11 and the shock absorbing members 4 is not critical. In other words, it is possible of either mounting the shock absorbing members 4 on the chassis 2 and fastening the fasteners 11 between the shock absorbing members 4 and the hard disk 1 in sequence or fastening the fasteners 11 between the shock absorbing members 4 and the hard disk 1 and mounting the shock absorbing members 4 on the chassis 2 in sequence. This can significantly increase yield.

Figure 4:
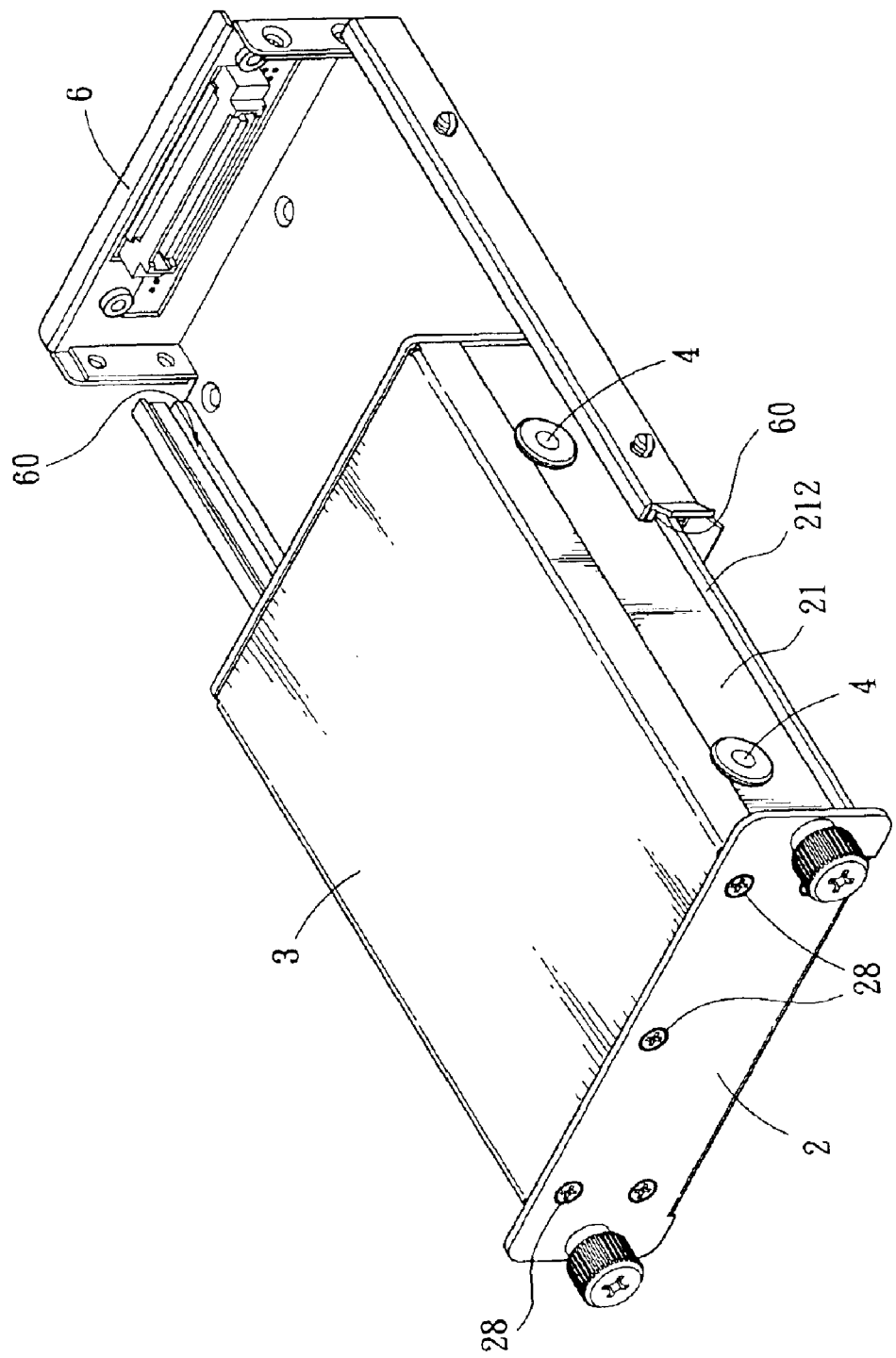
FIG. 4 is a perspective showing the chassis of FIG. 3 mounted in a cabinet according to a second preferred embodiment of the invention.

Referring to FIG. 4, the chassis 2 enclosing the hard disk can also be mounted in a cabinet 6 as applied in a Small Computer System Interface (SCSI) environment, i.e., the hard disk is served as a removable hard disk as compared with the fixed hard disk described in FIGS. 1 to 3. In detail, the cabinet 6 is mounted in the computer case. The cabinet 6 comprises an outer slide member 60 along either side. Correspondingly, the chassis 2 further comprises an inner slide member 212 along either side 21. The inner slide members 212 are able to matingly slide along the outer slide members 60 for permitting an easy pulling of the chassis 2 from the cabinet 6 for operation, service, or even removal.

While the invention herein disclosed has been described by means of specific embodiments, numerous modifications and variations could be made thereto by those skilled in the art without departing from the scope and spirit of the invention set forth in the claims.

What is claimed is:

1. A shock-avoiding structure for a parallelepiped hard disk, the hard disk including four threaded apertures in four corners, comprising:

a plurality of fasteners each having a first portion driven into the aperture and a second portion projected from the hard disk;

a parallelepiped chassis in a computer case for receiving the hard disk, the chassis including a plurality of recesses on either side; and a plurality of elongated shock absorbing members formed of elastomeric material, each of the shock absorbing members having a first section end urged against the second portion of the fastener, a second section projected from the side of the chassis, and an intermediate section separated the first section from the second section and anchored on the recess so as to suspend the hard disk in the chassis.

2. The shock-avoiding structure of claim 1, wherein each of the fasteners is a screw.

3. The shock-avoiding structure of claim 2, wherein the first portion of the screw is a threaded shank and the second portion thereof is an enlarged head.

4. The shock-avoiding structure of claim 1, wherein each of the shock absorbing members is a silicone rubber.

5. The shock-avoiding structure of claim 1, wherein each of the shock absorbing members is a sponge.

6. The shock-avoiding structure of claim 1, wherein each of the shock absorbing members is a rubber.

7. The shock-avoiding structure of claim 4 wherein a hardness value of the silicone rubber is ranged from about 9.5 to about 10.5.

8. The shock-avoiding structure of claim 1, wherein each of the shock absorbing members is a cylinder and the intermediate section is an annular groove.

9. The shock-avoiding structure of claim 1, wherein the shock-avoiding structure further comprises an upper pad on a top of the hard disk.

10. The shock-avoiding structure of claim 9, wherein the upper pad is a silicone rubber.

11. The shock-avoiding structure of claim 9, wherein the upper pad is a rubber.

12. The shock-avoiding structure of claim 9, wherein the upper pad is a sponge.

13. The shock-avoiding structure of claim 1, wherein the shock-avoiding structure further comprises a lower pad sandwiched between a bottom of the hard disk and a bottom of the chassis.

14. The shock-avoiding structure of claim 13, wherein the lower pad is a silicone rubber.

15. The shock-avoiding structure of claim 13, wherein the lower pad is a rubber.

16. The shock-avoiding structure of claim 13, wherein the lower pad is a sponge.

17. The shock-avoiding structure of claim 1, wherein the chassis further comprises an inner slide member along either side, and further comprising a parallelepiped cabinet in the computer case, the cabinet comprising an outer slide member along either side so that the inner slide members are adapted to matingly slide along the outer slide members.

* * * * *